(12) United States Patent
Park et al.

(10) Patent No.: US 8,682,405 B2
(45) Date of Patent: Mar. 25, 2014

(54) MOBILE TERMINAL

(75) Inventors: Seongjoon Park, Seoul (KR); Jaejun Jung, Seoul (KR); Jaichul Kim, Seoul (KR); Donghyuk Cho, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 13/432,728

(22) Filed: Mar. 28, 2012

(65) Prior Publication Data

US 2013/0017866 A1    Jan. 17, 2013

(30) Foreign Application Priority Data

Jul. 11, 2011    (KR) .................. 10-2011-0068293

(51) Int. Cl.
  *H04M 1/00*    (2006.01)
(52) U.S. Cl.
  USPC .................................... 455/575.4; 455/575.1

(58) Field of Classification Search
  USPC .......... 455/566, 575.1, 575.4, 90.3, 347, 348, 455/550.1; 379/433.01, 433.11, 433.12
  See application file for complete search history.

(56) References Cited

U.S. PATENT DOCUMENTS

| | | | |
|---|---|---|---|
| 7,532,169 B2* | 5/2009 | Joo et al. | 343/702 |
| 7,636,592 B2* | 12/2009 | Kim et al. | 455/575.4 |
| 7,831,285 B2* | 11/2010 | Lee | 455/575.4 |
| 7,877,119 B2* | 1/2011 | Kim | 455/575.1 |
| 8,185,174 B2* | 5/2012 | Kwon | 455/575.4 |

* cited by examiner

*Primary Examiner* — Sonny Trinh
(74) *Attorney, Agent, or Firm* — Birch, Stewart, Kolasch & Birch, LLP

(57) ABSTRACT

A mobile terminal includes a first body including a front case and a display disposed in the front case, a second body slidably mounted on the first body and a slide module including a slider mounted on the second body. The mobile terminal also includes a guide portion provided to the front case of the first body to guide a slide motion of the slider.

18 Claims, 10 Drawing Sheets

FIG. 9
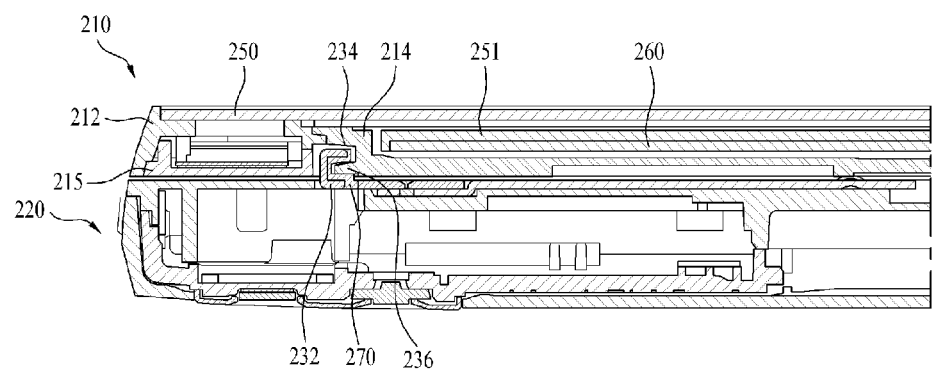
(a)
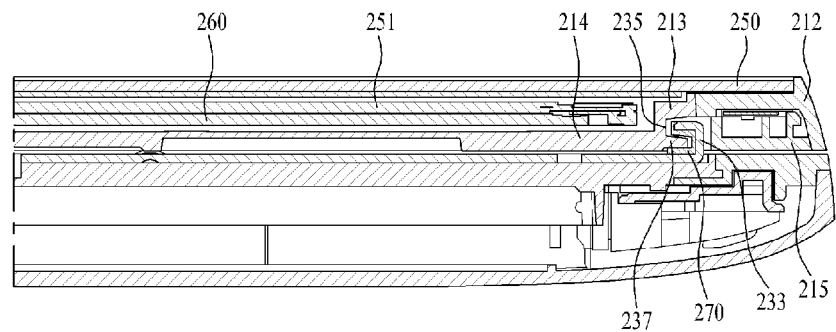
(b)

MOBILE TERMINAL

Pursuant to 35 U.S.C. §119(a), this application claims the benefit of earlier filing date and right of priority to Korean Application No. 10-2011-0068293, filed on Jul. 11, 2011, the contents of which are hereby incorporated by reference herein in their entirety.

BACKGROUND OF THE INVENTION

1. Field of the Invention

The present invention relates to a mobile terminal. Although the present invention is suitable for a wide scope of applications, it is particularly suitable for implementing a slim mobile terminal of a slide type.

2. Discussion of the Related Art

A mobile terminal is a device which may be configured to perform various functions. Examples of such functions include data and voice communications, capturing images and video via a camera, recording-audio, playing music files and outputting music via a speaker system, and displaying images and video on a display. Some terminals include additional functionality which supports game playing, while other terminals are also configured as multimedia players. More recently, mobile terminals have been configured to receive broadcast and multicast signals which permit viewing of contents, such as videos and television programs.

Generally, terminals can be classified into mobile terminals and stationary terminals according to a presence or non-presence of mobility. And, the mobile terminals can be further classified into handheld terminals and vehicle mount terminals according to availability for hand-carry.

There are ongoing efforts to support and increase the functionality of mobile terminals. Such efforts include software and hardware improvements, as well as changes and improvements in the structural components which form the mobile terminal.

SUMMARY OF THE INVENTION

Accordingly, the present invention is directed to a mobile terminal that substantially obviates one or more problems due to limitations and disadvantages of the related art.

An object of the present invention is to provide a slim mobile terminal of a slide type mobile terminal.

Another object of the present invention is to provide a mobile terminal of a slide type, by which a simple structure with light-weight may be implemented for a slide motion.

A further object of the present invention is to provide a mobile terminal of a slide type, by which the number of parts for a slide motion may be decremented to reduce a manufacturing cost.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal according to the present invention may include a first body including a front case and a display disposed in the front case, a second body slidably mounted on the first body, and a slide module including a slider mounted on the second body and a guide portion provided to the front case of the first body to guide a slide motion of the slider.

In another aspect of the present invention, a mobile terminal may include a first body including a display, a window enclosing the display and a front case having the display placed therein, a second body slidably mounted on the first body, and a slide module including first and second sliders mounted on the second body by being spaced apart from each other and first and second guide portions provided to the front case of the first body to guide slide motions of the first and second sliders, respectively.

Accordingly, a mobile terminal according to at least one embodiment of the present invention may decrement the number of parts for a slide motion and implement slimness and light-weight thereof.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 9 is an enlarged cross-sectional diagram of an assembly of the configuration members shown in FIG. 8.

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

The present invention can be applicable to a various types of terminals. Examples of such terminals include mobile as well as stationary terminals, such as mobile phones, user equipment, smart phones, DTV, computers, digital broadcast terminals, personal digital assistants, portable multimedia players (PMP) and navigators.

However, by way of non-limiting example only, further description will be with regard to a mobile terminal 100, and it should be noted that such teachings may apply equally to other types of terminals.

Figure 1:
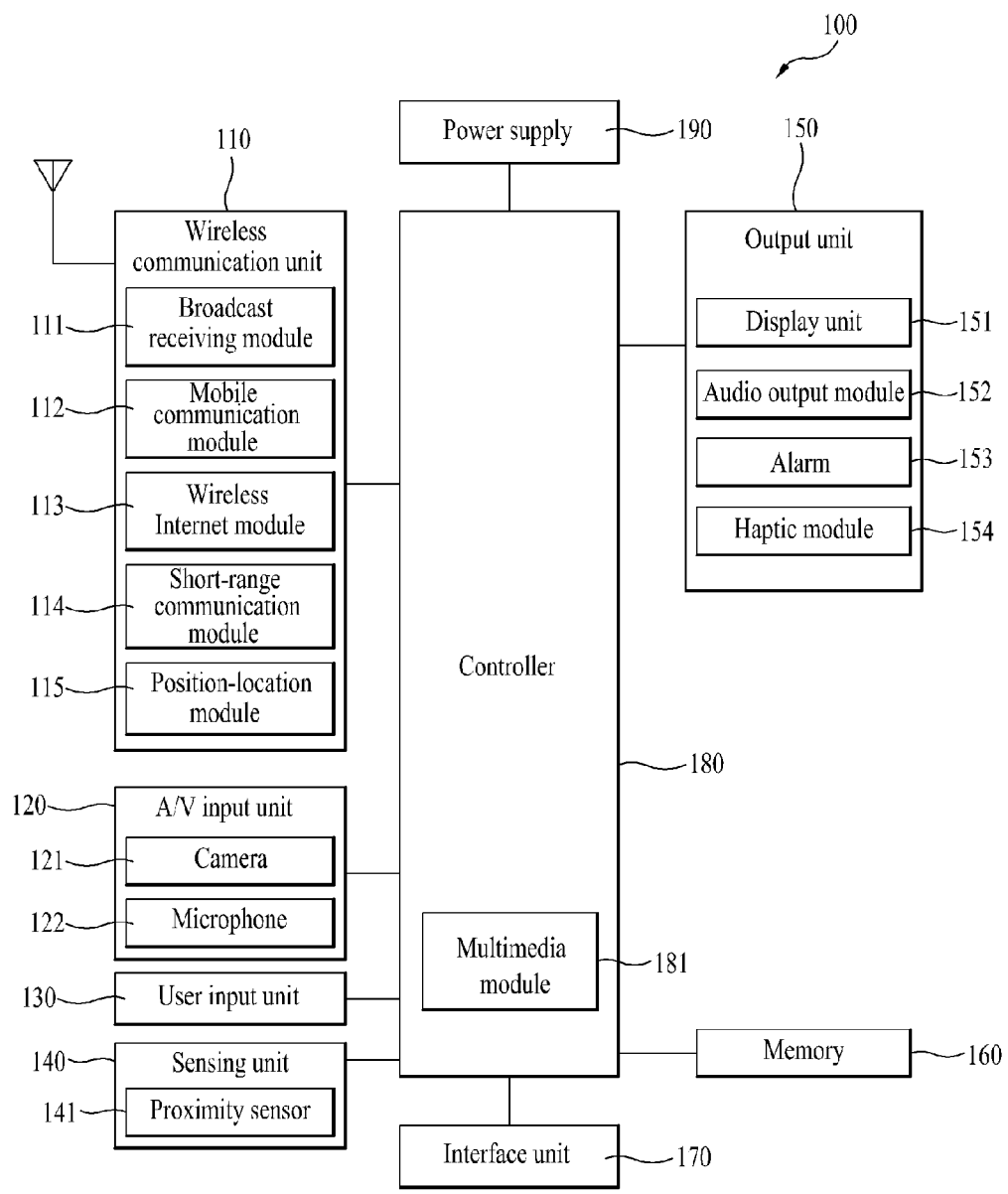
FIG. 1 is a block diagram of a mobile terminal in accordance with an embodiment of the present invention.

FIG. 1 is a block diagram of a mobile terminal 100 in accordance with an embodiment of the present invention. FIG. 1 shows the mobile terminal 100 having various components, but it is understood that implementing all of the illustrated components is not a requirement. Greater or fewer components may alternatively be implemented.

FIG. 1 shows a wireless communication unit 110 configured with several commonly implemented components. For example, the wireless communication unit 110 typically includes one or more components which permit wireless communication between the mobile terminal 100 and a wireless communication system or network within which the mobile terminal is located. In case of non-mobile terminals, the wireless communication unit 110 can be replaced with a wire communication unit. The wireless communication unit 110 and wire communication unit can be commonly referred to as a communication unit.

A broadcast receiving module 111 receives a broadcast signal and/or broadcast associated information from an external broadcast managing entity via a broadcast channel. The broadcast channel may include a satellite channel and a terrestrial channel. The broadcast managing entity generally refers to a system which transmits a broadcast signal and/or broadcast associated information.

At least two broadcast receiving modules 111 can be provided to the mobile terminal 100 in pursuit of simultaneous receptions of at least two broadcast channels or broadcast channel switching facilitation.

Examples of broadcast associated information include information associated with a broadcast channel, a broadcast program, a broadcast service provider, etc. For example, the broadcast associated information may include an electronic program guide (EPG) of digital multimedia broadcasting (DMB) and an electronic service guide (ESG) of digital video broadcast-handheld (DVB-H).

The broadcast signal may be implemented, for example, as a TV broadcast signal, a radio broadcast signal, and a data broadcast signal. If desired, the broadcast signal may further include a broadcast signal combined with a TV or radio broadcast signal.

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). Receiving multicast signals is also possible. If desired, data received by the broadcast receiving module 111 may be stored in a suitable device, such as a memory 160.

A mobile communication module 112 communicates wireless signals with one or more network entities such as a base station or Node-B. Such signals may represent, for example, audio, video, multimedia, control signaling, and data.

A wireless internet module 113 supports Internet access for the mobile terminal 100. This module may be internally or externally coupled to the mobile terminal 100. Suitable technologies for wireless internet may include, but are not limited to, WLAN (Wireless LAN) (Wi-Fi), Wibro (Wireless broadband), Wimax (World Interoperability for Microwave Access), and HSDPA (High Speed Downlink Packet Access). The wireless internet module can be replaced with a wire internet module in non-mobile terminals. The wireless internet module 113 and wire internet module may be commonly referred to as an internet module.

A short-range communication module 114 facilitates relatively short-range communications. Suitable technologies for short-range communication my include, but are not limited to, radio frequency identification (RFID), infrared data association (IrDA), ultra-wideband (UWB), as well as the networking technologies commonly referred to as Bluetooth and ZigBee.

A position-location module 115 identifies or otherwise obtains the location of the mobile terminal 100. This module may be implemented using, for example, global positioning system (GPS) components which cooperate with associated satellites, network components, and combinations thereof.

According to the current technology, the GPS module 115 is able to precisely calculate current 3-dimensional position information based on longitude, latitude and altitude by calculating distance information and precise time information from at least three satellites and then applying triangulation to the calculated information. Currently, location and time informations are calculated using three satellites, and errors of the calculated location position and time informations are then amended using another satellite. Besides, the GPS module 115 is able to calculate speed information by continuously calculating a real-time current location.

An audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video.

A microphone 122 receives an external audio signal while the portable device is in a particular mode, such as phone call mode, recording mode or voice recognition mode. This audio signal is processed and converted into digital data.

The portable device, and specifically the A/V input unit 120, typically includes assorted noise removing algorithms to remove noise generated in the course of receiving the external audio signal. Data generated by the A/V input unit 120 may be stored in the memory 160, utilized by the output unit 150, or transmitted via one or more modules of communication unit 110. If desired, two or more microphones and/or cameras may be used.

A user input unit 130 generates input data responsive to user manipulation of an associated input device or devices. Examples of such devices include a keypad, a dome switch, a touchpad such as static pressure/capacitance, a jog wheel and a jog switch. A specific example is one in which the user input unit 130 is configured as a touchpad in cooperation with a display, which will be described in more detail below.

A sensing unit 140 provides status measurements of various aspects of the mobile terminal 100. For example, the sensing unit may detect an open/close status of the mobile terminal 100, relative positioning of components such as a display and keypad of the mobile terminal, a change of position of the mobile terminal or a component of the mobile terminal, a presence or absence of user contact with the mobile terminal, orientation or acceleration/deceleration of the mobile terminal.

If the mobile terminal 100 is configured as a slide-type mobile terminal, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device.

An interface unit 170 is often implemented to couple the mobile terminal with external devices. Typical external devices include wired/wireless headphones, external chargers, power supplies, storage devices configured to store data such as audio, video, and pictures, as well as earphones and microphones. The interface unit 170 may be configured using a wired/wireless data port, audio input/output ports, video input/output port, a card socket for coupling to a memory card, a subscriber identity module (SIM) card, a user identity module (UIM) card, or removable user identity module (RUIM) card).

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

An output unit 150 generally includes various components that support the output requirements of the mobile terminal 100. A display 151 is typically implemented to visually display information associated with the mobile terminal 100. For example, if the mobile terminal 100 is operating in a phone call mode, the display will generally provide a user interface or graphical user interface that includes information associated with placing, conducting, and terminating a phone call. As another example, if the mobile terminal 100 is in a video call mode or a photographing mode, the display 151 may additionally or alternatively display images associated with these modes.

One particular implementation includes the display 151 configured as a touch screen working in cooperation with an input device, such as a touchpad. This configuration permits the display 151 to function both as an output device and an input device.

The display 151 may be implemented using known display technologies including a liquid crystal display (LCD), a thin film transistor-liquid crystal display (TFT-LCD), an organic light-emitting diode display (OLED), a flexible display and a three-dimensional display.

Some of the above displays can be configured transparent so that an external environment can be seen through the corresponding display. Such a display can be called a transparent display. As a representative example for the transparent display, there is a transparent LCD display or the like.

The mobile terminal 100 may include one or more of displays 151. An example of a two-display embodiment is one in which one display 151 is configured as an internal display viewable when the terminal is in an opened position and a second display 151 configured as an external display viewable in both the open and closed positions.

The touchscreen can be configured to detect a touch input pressure as well as a touch input position and size.

Meanwhile, a proximity sensor 141 can be provided within or around the touchscreen. The proximity sensor detects an object approaching a prescribed detecting surface or a presence or non-presence of an object existing around itself using an electromagnetic power or infrared rays without mechanical contact. Hence, the proximity sensor is superior to a contact sensor in lifespan and utilization.

Example for an operational principle of the proximity sensor is explained as follows. First of all, if an object approaches a sensor detecting surface while an oscillation circuit oscillates a sine radio frequency, an oscillation amplitude of the oscillation circuit attenuates or stops. This change is converted to an electric signal to detect a presence or non-presence of the object. So, even if any material except a metallic comes between the RF oscillation proximity sensor and the object, a proximity switch is able to detect the object to detect without interference with the material.

In spite of not providing the proximity sensor, if the touchscreen is electrostatic, it can be configured to detect the proximity of a pointer through an electric field change attributed to the proximity of the pointer.

So, in case that the pointer is placed in the vicinity of the touchscreen without being actually contacted with the touchscreen, it is able to detect a position of the pointer and a distance between the pointer and the touchscreen. For clarity and convenience of explanation, an action for enabling the pointer approaching the touchscreen to be recognized as placed on the touchscreen is named 'proximity touch' and an action of enabling the pointer to actually come into contact with the touchscreen is named 'contact touch'. And, a position, at which the proximity touch is made to the touchscreen using the pointer, means a position of the pointer vertically corresponding to the touchscreen when the pointer makes the proximity touch.

If the proximity sensor is used, it is able to sense a proximity touch and its pattern (e.g., proximity touch distance, proximity touch direction, proximity touch speed, proximity touch position, proximity touch moving state, etc.). And, it is also able to output information corresponding to the sensed proximity touch action and the proximity touch pattern to the touchscreen.

FIG. 1 further shows the output unit 150 having an audio output module 152 which supports the audio output requirements of the mobile terminal 100. The audio output module 152 is often implemented using one or more speakers, buzzers, other audio producing devices, and combinations thereof.

The audio output module 152 functions in various modes such as call-receiving mode, call-placing mode, recording mode, voice recognition mode and broadcast reception mode. During operation, the audio output module 152 outputs audio relating to a particular function or status, such as call received, message received, or errors.

The output unit 150 is further shown having an alarm 153, which is commonly used to signal or otherwise identify the occurrence of a particular event associated with the mobile terminal 100. Typical events include call received, message received and user input received.

An example of a signal provided by the output unit 150 is tactile sensations. For example, the alarm 153 may be configured to vibrate responsive to the mobile terminal 100 receiving a call or message. As another example, vibration is provided by the alarm 153 responsive to receiving user input at the mobile terminal 100, thereby providing a tactile feedback mechanism. It is understood that the various signals provided by the components of output unit 150 may be separately performed or performed using any combination of such components.

A memory 160 is generally used to store various types of data to support the processing, control, and storage requirements of the mobile terminal 100. Examples of such data include program instructions for applications operating on the mobile terminal 100, contact data, phonebook data, messages, pictures, and video.

Moreover, data for various patterns of vibration and/or sound outputted in case of a touch input to the touchscreen can be stored in the memory 160.

As map information can be stored in the memory 160, user's convenience can be further provided in a manner of providing the map information to a user if necessary. Moreover, a recent use history or a cumulative use frequency of each menu in the mobile terminal can be stored in the memory 160.

The memory 160 shown in FIG. 1 may be implemented using any type or combination of suitable volatile and nonvolatile memory or storage devices including random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, card-type memory, or other similar memory or data storage device.

A controller 180 typically controls the overall operations of the mobile terminal 100. For example, the controller 180 performs the control and processing associated with voice calls, data communications, instant message communication, video calls, camera operations and recording operations.

The controller 180 may include a multimedia module 181 that provides multimedia playback. The multimedia module 181 may be configured as part of the controller 180, or implemented as a separate component.

Moreover, the controller 180 is able to perform a pattern recognizing process for recognizing a writing input and a picture drawing input carried out on the touchscreen as characters or images, respectively.

A power supply 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. In some cases, such embodiments may also be implemented by controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

The mobile terminal 100 may be implemented in a variety of different configurations. Examples of such configurations include folder-type, slide-type, bar-type, rotational-type, swing-type and combinations thereof. For clarity, further disclosure will primarily relate to a slide-type mobile terminal 100. However such teachings apply equally to other types of mobile terminals.

Figure 2:
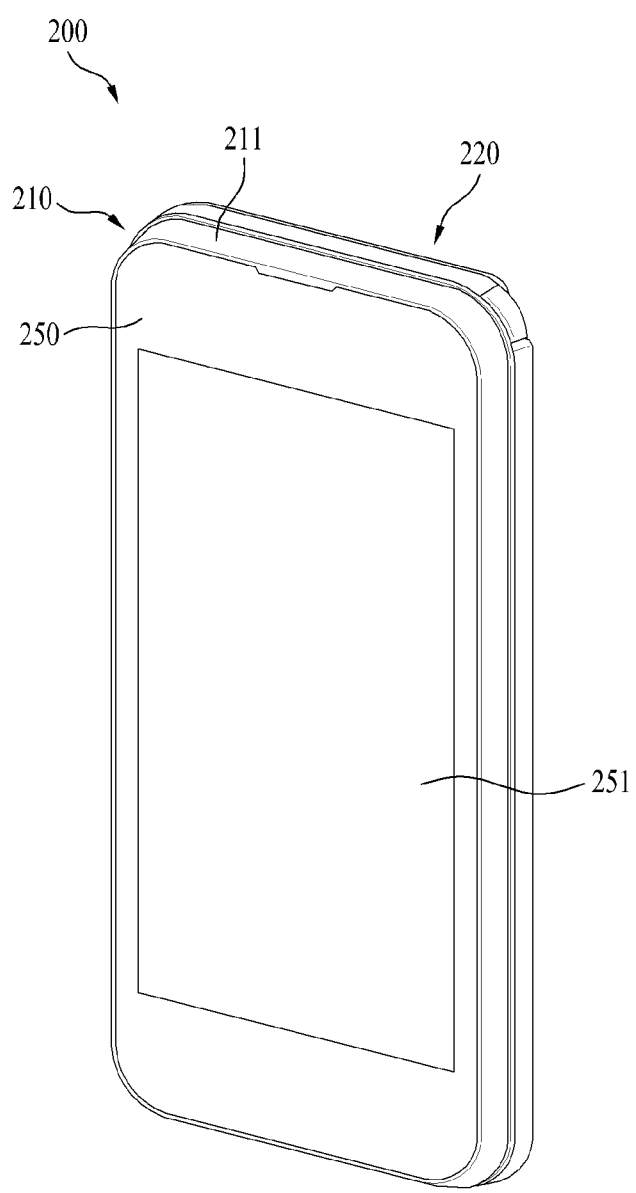
FIG. 2 is a perspective diagram for a closed configuration of a mobile terminal according to one embodiment of the present invention.
Figure 3:
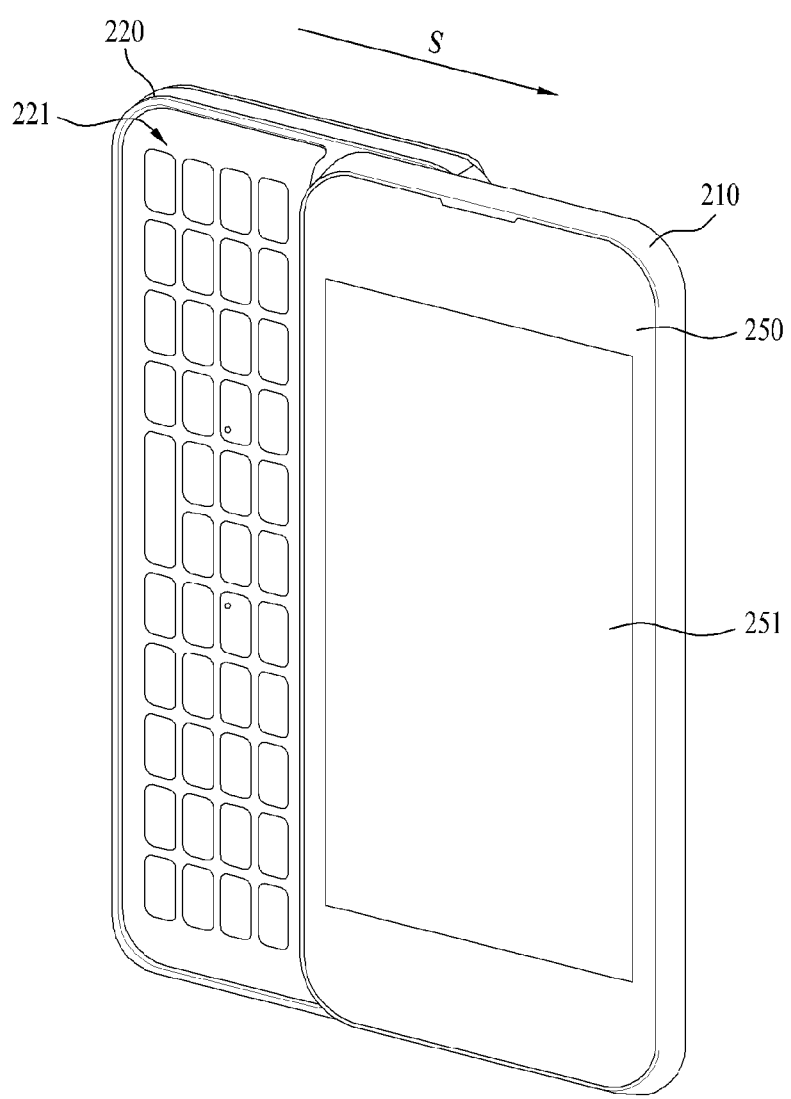
FIG. 3 is a perspective diagram for an open configuration of a mobile terminal according to one embodiment of the present invention.

FIG. 2 is a perspective diagram for a closed configuration of a mobile terminal according to one embodiment of the present invention. FIG. 3 is a perspective diagram for an open configuration of a mobile terminal according to one embodiment of the present invention.

First of all, a mobile terminal 200 according to one embodiment of the present invention may include a first body 210 and a second body 220 slidably mounted on the first body 220.

Referring to FIG. 2, if the first body 210 and the second body 220 are arranged in a manner of overlapping with each other, this configuration may be named a closed configuration. On the other hand, referring to FIG. 3, if the first body 210 slides in a slide motion direction S to expose at least one portion of the second body 220, this configuration may be named an open configuration.

The first body 210 and the second body 220 may include a case (not indicated by a reference number in the drawing) configuring an exterior thereof. In particular, the case configuring the exterior of the first and second bodies 210 and 220 may be divided into a front case and a rear case. And, various electric/electronic parts described with reference to FIG. 1 may be loaded in a space provided between the front and rear cases.

The case may be formed by injection molding of synthetic resin or may be formed of metal substance such as stainless steel (STS), titanium (Ti) and the like for example.

The wireless communication unit 110, the A/V input unit 120, the user input unit 130, the sensing unit 140, the output unit 150, the memory 160, the interface unit 170, the controller 180 and the power supply unit 190, which are described with reference to FIG. 1, may be provided to the first body 210 or the second body 220.

Referring to FIG. 2 and FIG. 3, a display 251 and a window 250 for protecting the display 251 may be provided to the first body 210. A keypad 221 may be provided to the second body 220. In a closed configuration of the mobile terminal 200, the display 251 is externally exposed. In an open configuration of the mobile terminal 200, the display 251 and the keypad 221 are externally exposed. In this case, the display 251 may include a touchscreen and the keypad 221 may include a touchpad.

Figure 4:
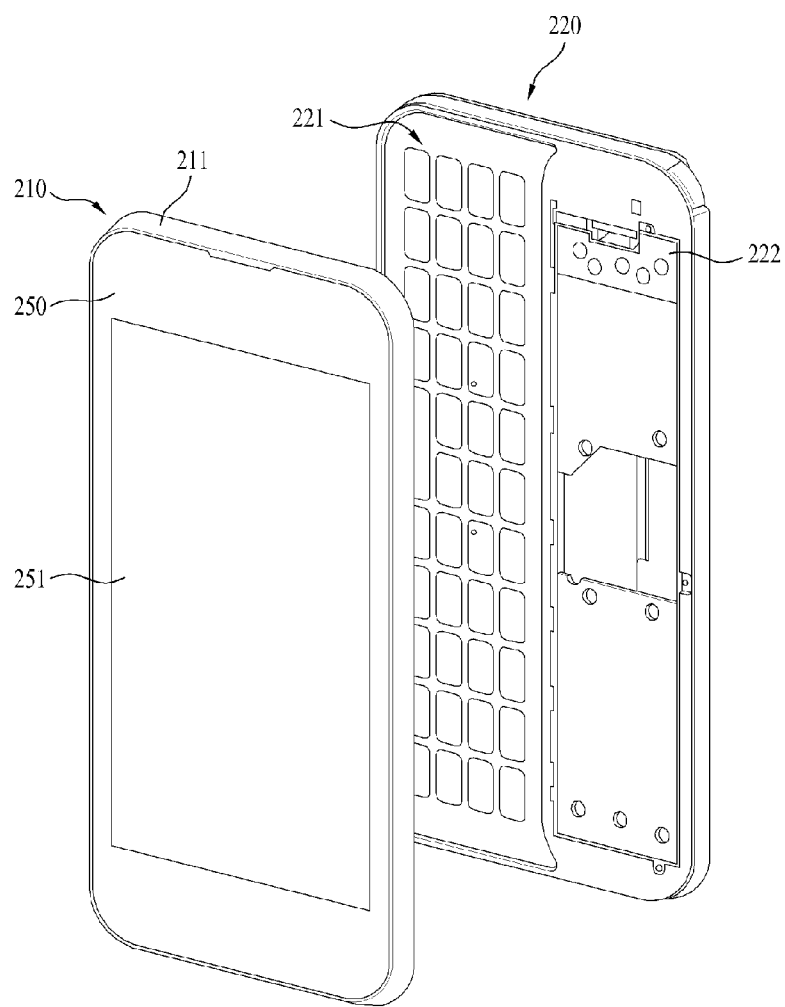
FIG. 4 is an exploded front perspective diagram of a mobile terminal according to one embodiment of the present invention.
Figure 5:
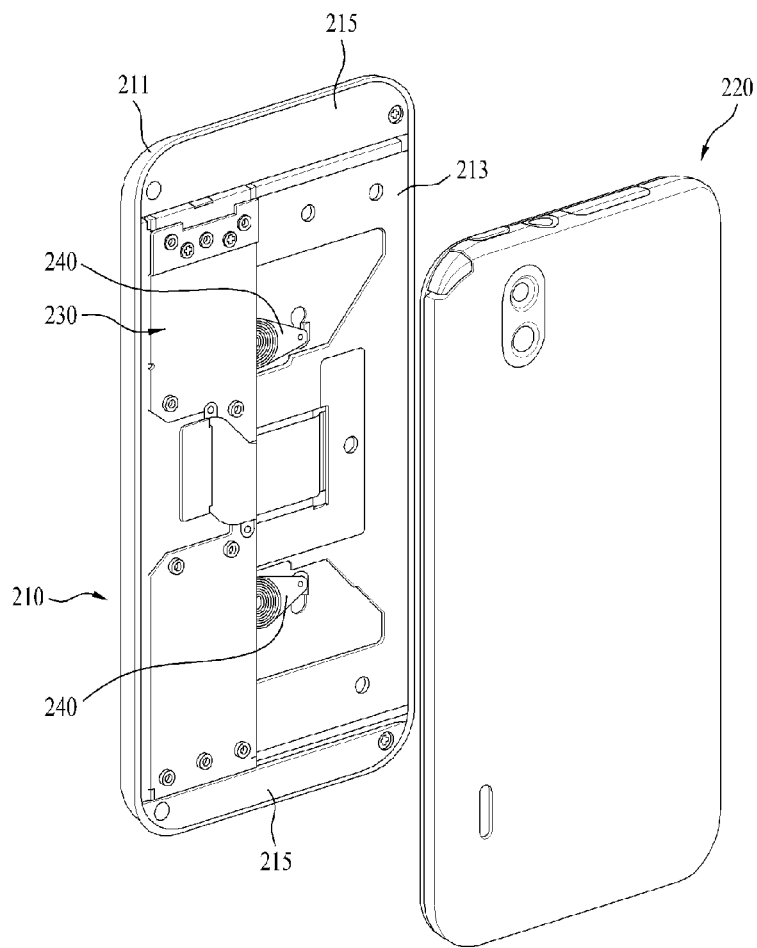
FIG. 5 is an exploded rear perspective diagram of a mobile terminal according to one embodiment of the present invention.
Figure 6:
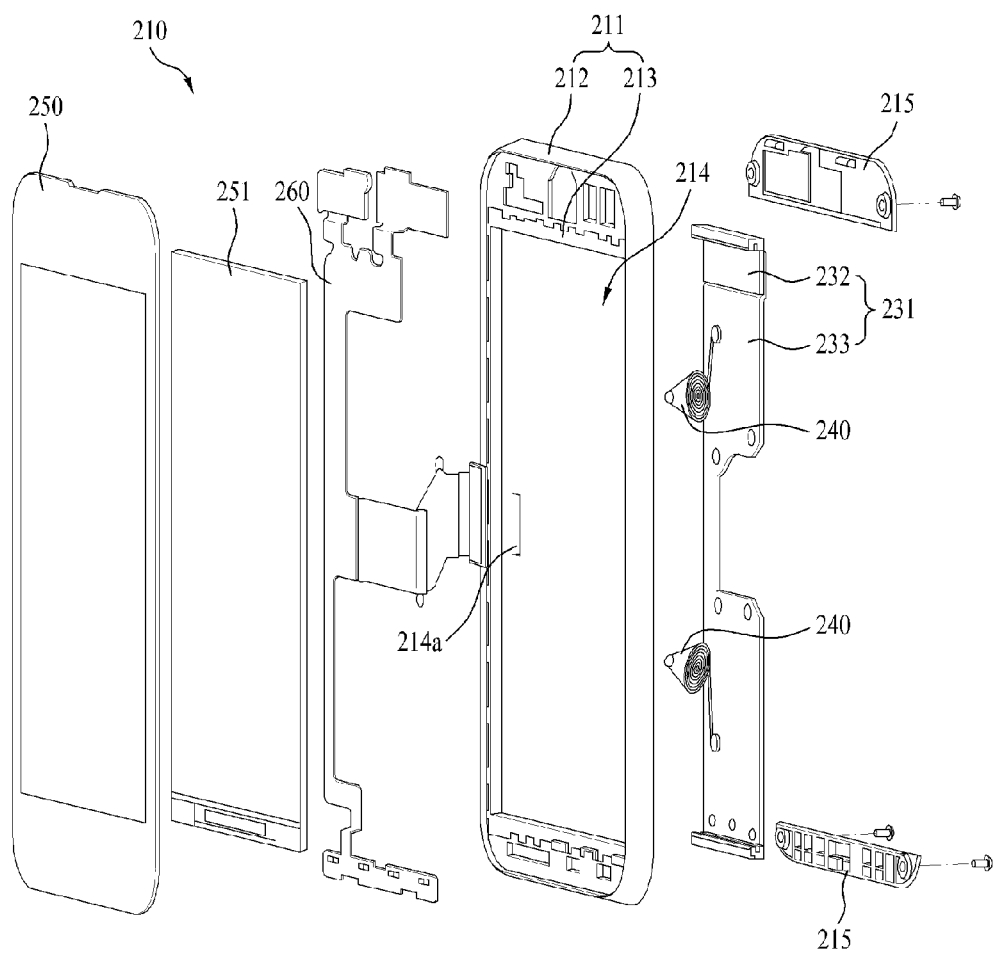
FIG. 6 is an exploded perspective diagram of a first body of a mobile terminal according to one embodiment of the present invention.
Figure 7:
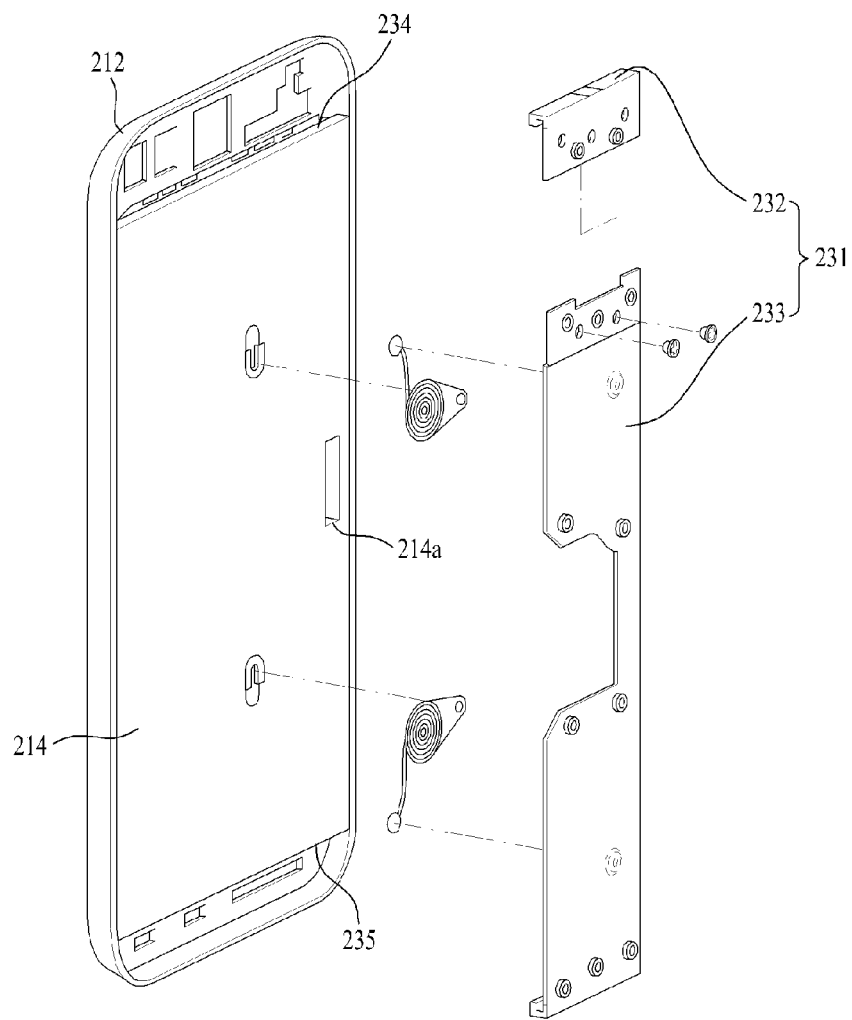
FIG. 7 is an exploded perspective diagram of a first body and a slide module of a mobile terminal according to one embodiment of the present invention.

FIG. 4 is an exploded front perspective diagram of a mobile terminal according to one embodiment of the present invention. FIG. 5 is an exploded rear perspective diagram of a mobile terminal according to one embodiment of the present invention. FIG. 6 is an exploded perspective diagram of a first body of a mobile terminal according to one embodiment of the present invention. FIG. 7 is an exploded perspective diagram of a first body and a slide module of a mobile terminal according to one embodiment of the present invention.

Referring to FIGS. 4 to 7, a mobile terminal 200 according to one embodiment of the present invention may include a first body 210 including a display 251 and a front case 211 having the display 251 arranged thereon, a second body 220 slidably mounted on the first body 210, and a slide module 230 configured to guide a slide motion of the first body 210.

The slide module 230 may include a slider 231 mounted on the second body 220 and a pair of guide portions 234 and 235 configured to guide the slide motion of the slider 231.

In this case, the slider 231 and the guide portions 234 and 235 may be formed of metal material to secure rigidity due to the repeated slide motion. Referring to FIG. 4, a mounting part 222 is provided to the second body 220 to fix the slider 231 thereto. Particularly, the mounting part 222 may be formed of metal material.

Meanwhile, since the demand for implementing slimness and light-weight of the mobile terminal 200 is recently increasing, many ongoing efforts are made to decrease the thickness of the mobile terminal 200 of a slide type.

Generally, a slide type mobile terminal includes a slide module provided between a first body and a second body, a fixing member provided to the first body, and a slide member provided to the second body to be guided along the fixing member.

In this case, an overall thickness of the mobile terminal may depend of a sum of a thickness of the first body, a thickness of the second body and a thickness of the slide member. Moreover, since the fixing member and the slide member are separately formed of different members, the number of parts is incremented and a manufacturing process gets complicated.

Meanwhile, in the mobile terminal 100 according to one embodiment of the present invention, the guide portions 234 and 235 for guiding the slide motion of the slider 231 may be provided to the front case 211 of the first body 210.

The configuration of the first body 210 and the second body 211 may be described in detail with reference to FIG. 6 as follows.

First of all, the front case 211 may include a first member 212 having an opening (not shown in the drawing) and a second member 213 fixed to the opening by being formed of metal material.

Referring to FIG. 6 and FIG. 7, the first member 212 configures an exterior of the front case 211 and may be formed of resin material. And, the first member 212 may be provided with a window 250 for protecting the display 251.

And, the second member 213 may include a recessed portion 214 protruding backward from the first member 212 to receive the display 251 therein.

Preferably, the first member 212 is formed of resin material for the light weight implementation. Preferably, the second member 213 is formed of metal material to secure rigidity of the guide portions 234 and 235 built in one body of the recessed portion 214. And, the first member 212 and the second member 223 may be formed by injection molding.

In order to enable the slider 231 to be inserted, the guide portions 234 and 235 may include first and second guide portions 234 and 235 provided to the second member 213 of the front case 211 in a slide direction S of the second body 220, respectively. And, the first guide portion 234 and the second guide portion 235 may be provided to both sides of an outer circumference of the recessed portion 214, respectively.

Meanwhile, the display 251 may be provided to a front side of the front case 211, and more particularly, within the recessed portion 214. A circuit board 260 electrically connected to the display 251 may be provided between an inner circumference of the recessed portion and the display 251. In this case, the circuit board 260 may be electrically connected to the controller 180 shown in FIG. 1 provided to the second body 220 via a perforating hole 214a provided to the recessed portion 214.

In particular, the display 251 and the circuit board 260, which are provided within the first body 210 may be provided to the recessed portion 214 through the front side of the front case 211, thereby enhancing efficiency in assembly. Moreover, after the display 251 and the circuit board 260 have been placed in the recessed portion 214, a window 250 for protecting the display 251 may be mounted on the first member 212 of the front case 211.

Meanwhile, the first body 210 may include a rear case 215 mounted on a backside of the front case 211. In this case, the rear case 215 may be mounted on a backside of the first member 212 to avoid overlapping with the recessed portion 214 of the second member 213.

Moreover, a thickness of the rear case 215 may be determined in a manner that the rear case 215 does not protrude further than the recessed portion in a rear direction of the front case 211. In particular, an overall thickness of the first body 210 may depend on a depth of the recessed portion 214 of the second member 213 only. In more particular, the depth of the recessed portion 214 may depend on the thicknesses of the display 251 and the circuit board 260 placed in the recessed portion 214.

Referring to FIG. 7, both end portions of the slider 231 may be fitted in the first and second guide portions 234 and 235 provided to both sides of an outer circumference of the recessed portion 214, respectively, in a manner that the slider 231 encloses the backside of the recessed portion 214. In particular, both of the end portions of the slider 231 may have a configuration to be fitted in the first and second guide portions 234 and 235. For example, each of the end portions of the slider 231 may have a cross-section shaped like a one-side-open square (e.g., ⊓).

In order to enhance assembly efficiency, the slider 231 may include a first sliding member 232 fitted in the first guide portion 234 and a second sliding member 233 assembled together with the first sliding member 233.

Hence, the slider 231 may be slidably mounted on the guide portions 234 and 235 in a following manner. First of all, the first sliding member 232 and the second sliding member 233 are fitted in the first guide portion 234 and the second guide member 235, respectively. Secondly, the first sliding member 232 and the second sliding member 233 are locked together.

Meanwhile, the slide module 230 may further include an elastic member 240 fixed to the slider 230 and the backside of the recessed portion 214. In this case, the elastic member 240 may apply an elastic force when the slider 231 is slid in a prescribed distance and may perform a function of sliding the first body 210 automatically by a remaining distance. And, both end portions of the elastic member 240 may be fixed to the slider 230 and the backside of the recessed portion 214, respectively.

Since the first guide portion 234, the second guide portion 235 and the slider 231 are formed of metal material, a lubricant member 270 (see FIG. 8) may be provided between the slider 231 and each of the first and second guide portions 234 and 235 to secure a smooth slide motion. In particular, the lubricant member 270 may be formed of POM resin having good lubricant property.

Figure 8:
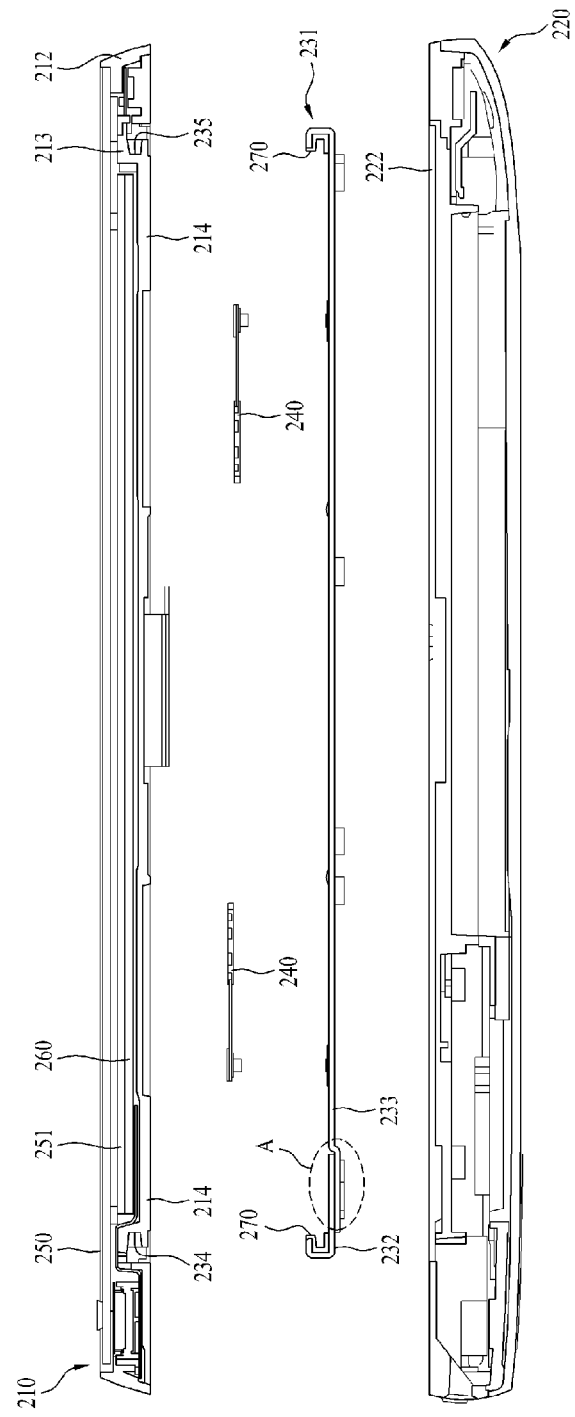
FIG. 8 is an exploded cross-sectional diagram of configuration members of a mobile terminal according to one embodiment of the present invention.

FIG. 8 is an exploded cross-sectional diagram of configuration members of a mobile terminal according to one embodiment of the present invention. FIG. 9 is an enlarged cross-sectional diagram of an assembly of the configuration members shown in FIG. 8.

In the following description, the first guide portion 234 and the second guide portion 235 are explained in detail with reference to the accompanying drawings.

Referring to FIG. 8 and FIG. 9, the first guide portion 234 and the second guide portion 235 may be able to include a first guide projection 236 and a second guide projection 237 projected out of both sides of an outer circumference of the recessed portion 214a, respectively. In particular, both end portions of the slider 231, each of which has a cross-section shaped like one-side-open square (e.g., ⊓), are placed in a manner of enclosing the first and second guide projections 236 and 237, respectively. And, the lubricant member 270 may be provided between the first/second guide projection 236/237 and the first/second sliding member 232/233.

Moreover, the first guide portion 234 and the second guide portion 235 may include recesses 234 and 235 formed on both sides of the outer circumference of the recessed portion 214a along a slide motion direction, respectively.

Both of the end portions of the slider 231, each of which has a cross-section shaped like the one-side-open square (e.g., ⊓), may be fitted in the recesses 234 and 235, respectively. According to the present embodiment, the first guide portion 234 and the second guide portion 235 may be able to only include the first guide projection 236 and the second guide projection 237, which are projected from both sides of the outer circumference of the recessed portion 214, respectively. Alternatively, the first guide portion 234 and the second guide portion 235 may be able to include a recess, the first guide projection 236 and the second guide projection 237 all.

In case that the first guide portion 234 and the second guide portion 235 include the first guide projection 236 and the second guide projection 237 only, since both of the end portions of the slider 231 should further protrude by the lengths for the end portions to be fitted in the first guide projection 236 and the second guide projection 237, respectively, the first guide portion 234 and the second guide portion 235 may preferably include the recess, the first guide projection 236 and the second guide projection 237 all.

As mentioned in the foregoing description, an overall thickness of a mobile terminal of a slide type may normally depend on a sum of a thickness of a first body, a thickness of a second body, a thickness of a fixing member and a thickness of a slide member.

Yet, an overall thickness of the first body 210 may depend on a depth of the recessed portion 214 of the second member 213 only. Since the first guide portion 234 and the second guide portion 235 are provided to both lateral sides of the recessed portion 214 only, they have no influence on the overall thickness of the first body 210.

Therefore, the mobile terminal 200 according to one embodiment of the present invention does not need a separate fixing member, can reduce a thickness of the mobile terminal 200 by forming the first guide portion 234 and the second guide portion 235 to the front case 211 to guide the slider 231, and can decrement the number of parts for the slide motion. Therefore, the mobile terminal 200 according to one embodiment of the present invention may have light weight.

The second member 213 having the first guide portion 234, the second guide portion 235 and the recessed portion 214 are formed by die casting and the second member 213 and the first member 212 may be formed by insert injection to form the front case 211. Therefore, the present invention simplifies a corresponding manufacturing process and also reduces a corresponding manufacturing cost.

As the display 251 and the circuit board 260 provided within the first body 210 can be provided in one body to the recessed portion 214 through the front side of the front case 211, assembly efficiency may be enhanced.

Figure 10:
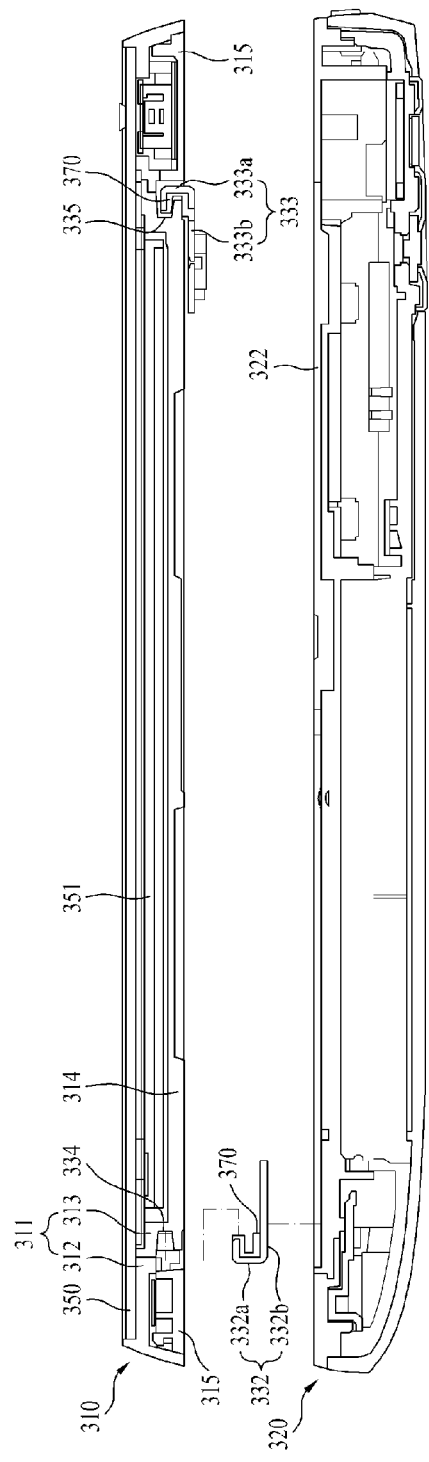
FIG. 10 is an exploded cross-sectional diagram of configuration members of a mobile terminal according to another embodiment of the present invention.

FIG. 10 is an exploded cross-sectional diagram of configuration members of a mobile terminal according to another embodiment of the present invention.

Referring to FIG. 10, a mobile terminal 300 according to another embodiment of the present invention may include a first body 310, a second body 320 slidably mounted on the first body 310 and a slide module.

In particular, the mobile terminal 300 may include a first body 310 including a display 351 and a front case 311 having the display 351 placed therein, a second body 320 slidably mounted on the first body 310, and a slide module including first and second sliders 332 and 333 provided to the second body by being spaced apart in a prescribed interval and first and second guide portions 334 and 335 provided to the front case 311 of the first body 310 to guide slide motions of the sliders 332 and 333.

Meanwhile, the front case 311 may include a first member 312 having an opening and a second member 313 fixed to the opening by being formed of metal material. And, a recessed portion 314 may be provided, in a manner of protruding in rear direction of the first member 312, to the second member 313 to have the display placed therein.

A rear case 315 may be mounted on a backside of the first member 312. A window 350 may be mounted on the front case 311 to protect the display 351.

In this instance, the first guide portion 334 and the second guide portion 335 may include recesses formed along a slide direction at both sides of an outer circumference of the recessed portion 314, respectively.

As the first body 310, the second body 320 and the first and second guide portions 334 and 335 of the slide module may have the same configuration of the former first body 210, the former second body 220 and the former first and second guide portions 234 and 235 of the former slide module 230, details thereof may be omitted from the following description.

The mobile terminal 300 according to the present embodiment may differ from the former mobile terminal 200 in that the former slider 231 may be separated into a first slider 332 and a second slider 333.

In particular, in order to enhance assembly efficiency of the former mobile terminal 200, the slider 231 is manufactured by being separated into the first sliding member 232 an the second sliding member 233. Considering the assembled configuration, the slider 231 is fitted in each of the guide portions 234 and 235 in a manner of enclosing the backside of the recessed portion 214.

On the contrary, according to the present embodiment, the first slider 332 and the second slider 333 are not assembled together. Instead, the sliders 332 and 333 are fixed to a mounting portion 322 provided to the second body 320 while fitted in the corresponding guide portions 334 and 335, respectively.

In particular, the first slider 332 may be divided into a first region 332a fitted in the first guide portion 334 and a second region 332b fixed to the second body 320 by corresponding to a partial region of a backside of the recessed portion 314. And, the second slider 333 may be divided into a first region 333a fitted in the second guide portion 335 and a second region 333b fixed to the second body 320 by corresponding to a partial region of the backside of the recessed portion 314.

The slider 332/333 may have a cross-section shaped like one-side-open square (e.g., ⊓) to be fitted in the corresponding guide portion 334/335. And, the slide module may include a lubricant member 370 provided between the first region 332a/333a of the slider 332/333 and the corresponding guide portion 334/335.

The slide module may further include an elastic member (not shown in the drawing) fixed to the second region 332b/333b of the corresponding slider 332/333 and the backside of the recessed portion 314.

The former mobile terminal 200 does not need a separate fixing member. And, a thickness of the former mobile terminal 200 can be reduced by providing the first and second guide portions 234 and 235 to the front case 211 to guide the slider 231. And, the former mobile terminal 200 can be light-weighted by reducing the number of parts for the slide motion.

On the other hand, since a region corresponding to the backside of the recessed portion 214 disappears from the whole region of the slider 231, the mobile terminal 200 according to the present embodiment has an extra-space between the mounting portion 322 of the second body 320 and the backside of the recessed portion 314 of the first body 310. According to the present embodiment, various configuration members used to be placed within the first body 310 or the second body 320 are placed in the extra-space. Therefore, space can be further utilized and the overall thickness of the mobile terminal 300 can be reduced.

Besides, if a groove is provided to the mounting portion 322 to place the second region 332b/333b of the corresponding slider 332/333, it may be able to further reduce the overall thickness of the mobile terminal 300.

As mentioned in the foregoing description, the above-configured mobile terminal according to at least one embodiment of the present invention may reduce the number of parts for the slide motion and may be able to implement slimness and light weight.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal comprising:
a first body including a front case and a display disposed in the front case;
a second body slidably mounted on the first body; and
a slide module including a slider mounted on the second body and a guide portion provided to the front case of the first body to guide a slide motion of the slider,
wherein the front case comprises:
a first member having an opening; and
a second member fixed to the opening, the second member including a metal material, and
wherein the guide portion comprises first and second guide portions respectively provided to the second member along a slide direction of the second body to have the slider fitted therein.

2. The mobile terminal of claim 1, wherein the first member includes a resin material.

3. The mobile terminal of claim 2, wherein the first member and the second member are insert-injected molded members.

4. The mobile terminal of claim 1, wherein the second member comprises a recessed portion protruding in a rear direction of the first member to have the display placed therein.

5. The mobile terminal of claim 4, wherein the first and second guide portions are provided to an outer circumference of the recessed portion and are recessed to both sides of the outer circumference, respectively.

6. The mobile terminal of claim 4, further comprising:
an elastic member fixed to the slider and a backside of the recessed portion.

7. The mobile terminal of claim 5, wherein the slider is fitted in each of the first and second guide portions by enclosing a backside of the recessed portion.

8. The mobile terminal of claim 7, wherein the slider comprises:
a first sliding member fitted in the first guide portion; and
a second sliding member assembled together with the first sliding member, the second sliding member fitted in the second guide portion.

9. The mobile terminal of claim 4, wherein the first and second guide portions are provided to an outer circumference of the recessed portion and are projected from both sides of the outer circumference, respectively.

10. The mobile terminal of claim 1, further comprising:
a lubricant member placed between each of the guide portions and the slider.

11. The mobile terminal of claim 1, further comprising:
a rear case mounted on a backside of the first member not to overlap with the second member.

12. A mobile terminal comprising:
a first body including a display, a window enclosing the display and a front case having the display placed therein;
a second body slidably mounted on the first body; and
a slide module including first and second sliders mounted on the second body by being spaced apart from each other and including first and second guide portions provided to the front case of the first body to guide slide motions of the first and second sliders, respectively,
wherein the front case comprises:
a first member having an opening, the first member corresponding to a circumference of the window; and
a second member fixed to the opening, the second member formed of metal material, and
wherein the second member includes a recessed portion protruding in a rear direction of the first member to have the display placed therein.

13. The mobile terminal of claim 12, wherein the first and second guide portions comprise recesses provided to both sides of an outer circumference of the recessed portion along a slide direction, respectively.

14. The mobile terminal of claim 13, wherein each of the first and second sliders is divided into a first region fitted in the corresponding guide portion and a second region fixed to the second body by corresponding to a partial region of a backside of the recessed portion.

15. The mobile terminal of claim 14, wherein each of the first and second sliders has a cross-section shaped one-side-open square.

16. The mobile terminal of claim 14, further comprising:
a lubricant member between the first region of each of the sliders and the corresponding guide portion.

17. The mobile terminal of claim 14, further comprising:
an elastic member fixed to the second region of each of the sliders and the backside of the recessed portion.

18. The mobile terminal of claim 12, wherein the first member includes a resin material, and
wherein the first member and the second member include insert-injected molded members.

* * * * *